Figure 1:
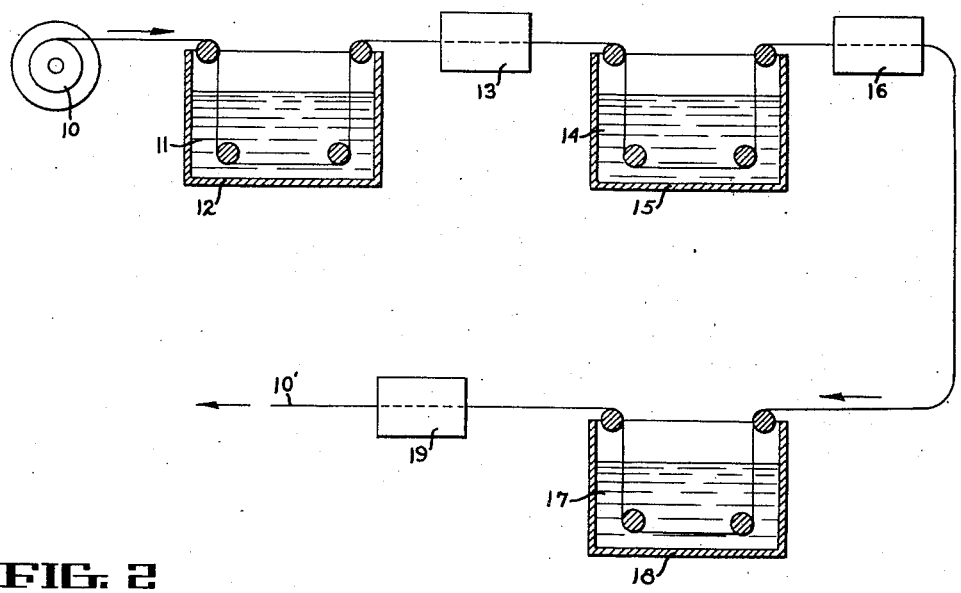

Aug. 14, 1945.  E. L. LUÁCES ET AL  2,382,081
METHOD OF TREATING WIRE FOR BELT MANUFACTURE
Filed March 8, 1943

INVENTORS
ENRIQUE L. LUACES
MELVIN A. CROSBY
BY Toulmin & Toulmin
ATTORNEYS

Patented Aug. 14, 1945

2,382,081

UNITED STATES PATENT OFFICE 2,382,081

METHOD OF TREATING WIRE FOR BELT MANUFACTURE

Enrique L. Luáces and Melvin A. Crosby, Dayton, Ohio, assignors to The Dayton Rubber Manufacturing Company, Dayton, Ohio, a corporation of Ohio Application March 8, 1943, Serial No. 478,429

5 Claims. (Cl. 57—164)

This invention relates to the treatment of fine wire such as may be used in the manufacture of belts.

More particularly, the present invention deals with methods whereby fine wire may be treated to increase its adhesiveness with respect to rubber compositions such as are generally used in the manufacture of belts of the V-type. In copending applications Serial No. 478,428, and Serial No. 478,435, both filed coincident herewith, it has been stated that wire adapted to be used in the manufacture of belts such as V-belts may be advantageously treated with plastic compositions in order to improve or enhance the adhesive bond between the wire and the rubber composition of which the belt body is made, and the present invention deals particularly with methods which may be advantageously applied to increase the adhesive bond between the metal wire and the plastic composition applied thereon or to increase the adhesive bond between the wire itself and the rubber composition without necessarily making use of a preliminary plastic coating on the wire.

Since the adhesion between metal and rubber compositions is notoriously poor, it is desirable and advantageous to provide wire which is to be used as a reinforcing or strength element in belts with a surface which will lead to a strong, firm and lasting bond between the wire and the rubber composition in which it is to be embedded. According to the invention disclosed and claimed in copending application Serial No. 478,435, filed coincident herewith, the wire is first treated chemically to remove from its surface impurities which would prove detrimental to adhesion and subsequently coated with a plastic composition possessing the characteristics of adhering firmly to metal as well as to rubber, and thereby a wire is produced which may be used to advantage in the manufacture of belts and which will lead to the formation of an integral unitary article when the belt body is vulcanized in the course of the manufacture of the belt.

The present invention differs from the foregoing in that the preliminary chemical treatment is not for the purpose of removing surface impurities but rather to condition the surface to receive either a coating of plastic composition or a coating of rubber composition. In either case the desired result is to obtain a firm bond between the coating and the wire by conditioning the surface of the wire so that a mechanical anchoring of the coating may be obtained.

Figure 2:
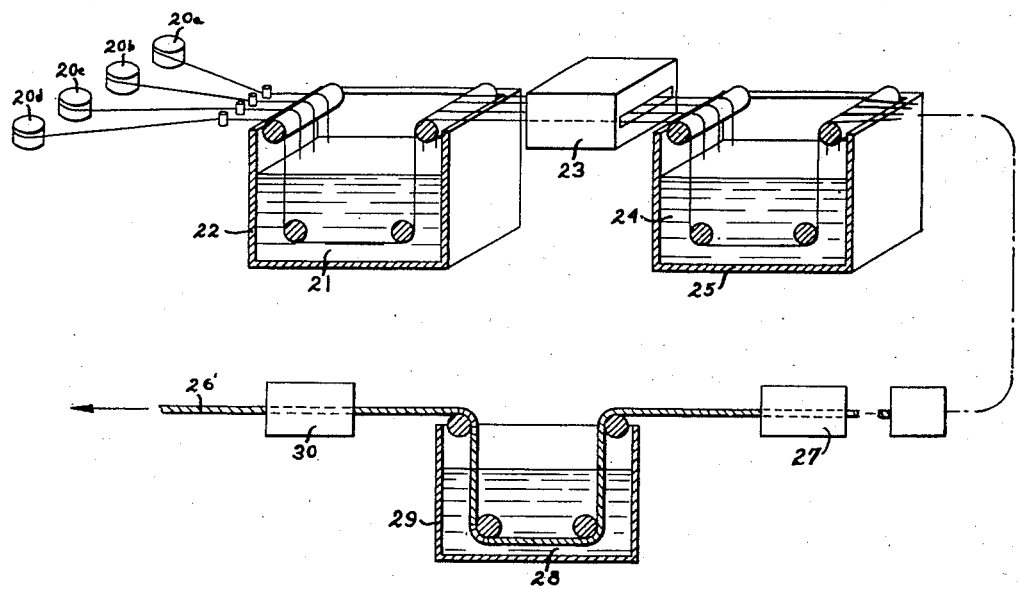

The nature of the present invention will be fully understood from the following description taken in connection with the annexed drawing, in which:

Fig. 1 is a diagrammatic representation of the several steps in a process wherein a single strand of wire is subjected to treatment according to the present invention; and Fig. 2 is a diagrammatic representation of the several steps in a method wherein a plurality of strands of wire are subjected to treatment to form a cable which may be used in the practice of the present invention.

Referring to Fig. 1 in particular, 10 represents wire wound on a reel, 11 is an acid bath held in a vessel 12, 13 is a drying compartment or oven, 14 is a bath of plastic composition held in a vessel 15, 16 is a baking oven, 17 is a bath of rubber composition held in a vessel 18, and 19 is a drying compartment or oven.

In carrying out the method illustrated in Fig. 1, wire from the reel is first passed through a bath comprising an acid. For example, a 10% solution of hydrochloric acid or a 25% solution of phosphoric acid would prove satisfactory and advantageous. The purpose of the acid solution is to act upon the surface of the wire and to cause a pitting or roughening thereof so as to provide an uneven surface on which coatings subsequently to be applied may anchor firmly. In certain instances, the wire may be advantageously subjected to electrolytic treatment while passing through the acid bath, and in such an event the wire is caused to carry one pole and the vessel the opposite pole. Such electrolytic treatment results in a more rapid conditioning of the surface and permits a greater output from any given piece of equipment.

After the wire reaches the acid bath 11 in the vessel 12 it passes through a drying compartment or oven wherein it is dried and heated, and it may then be utilized directly in the manufacture of belts since the nature of its surface is such that the rubber composition of which the belt is made will firmly adhere to it. However, if so desired, the wire leaving the oven 13 may be passed through a bath 14 of plastic composition held in the liquid stage in vessel 15 and therefrom through a baking compartment or oven 16 wherein the plastic composition is caused to set. At this point there is obtained a wire having deposited thereon a coating of a plastic composition which is adherent to metal and also to rubber-like substances such as used in the manufacture of rubber belts. At this stage, again, the wire may be used directly in the manufacture of belts; however, if so desired, it may be wound in reels and stored or it may be subjected to the following additional steps:

The wire leaving the baking compartment or oven 16 is immersed or passed through a bath of rubber composition 17 dissolved in suitable solvent and held in vessel 18 and thereafter through a drying compartment or oven 19 wherein the solvent is evaporated. The wire leaving the drying compartment or oven 19 is denominated 10' and comprises a core of wire, a coating of plastic composition baked thereon, and a superposed coating of rubber composition deposited on and adhering to the baked plastic coating.

Referring now to Fig. 2, 20a, 20b, 20c and 20d represent a plurality of strands of fine wire wound in corresponding reels. These multiple strands of wire are first passed through an acid solution 21 (of the nature hereinbefore mentioned) held in vessel 22 in the same manner and for the same reason as stated hereinbefore with respect to the acid solution 11 of Fig. 1. The multiple strands of wire leaving the vessel 22 are passed through a drying compartment or oven 23 wherein they are dried in the same manner as the single strand of wire in Fig. 2 was dried in the drying compartment or oven 13, and the dried wires may then be used directly, if desired, in the manufacture of rubber belts since the surface of the wires will be conditioned properly firmly to adhere to rubber composition. If it is desired to use cabled wire in building such belts, the multiple strands of wire leaving the drying compartment or oven 23 may be cabled by twisting or by braiding to form such cable.

The multiple strands of wire leaving the drying compartment or oven 23, however, may be further treated in the same manner as the single strand of wire leaving the drying compartment or oven 13 in Fig. 1 was described as being treated with plastic composition. If this is desired, the multiple strands of wire leaving the drying compartment or oven 23 are passed through a bath of plastic composition 24 maintained in liquid form in the vessel 25, and as the multiple strands leave the vessel 25, they may be twisted to form a cable 26 which is then passed through the baking compartment or oven 27 wherein the plastic composition coated on the strands of wire is caused to harden. Obviously, of course, it is not necessary to twist the plastic coated multiple strands of wire into a cable unless it is so desired. It will be also understood that the cable 26 need not be made by twisting the multiple strands of wire and that it may be made by braiding them.

The cable 26 obtained by twisting (or by braiding) the multiple strands of wire leaving the vessel 25 and baking the cabled strands in the baking compartment or oven 27 may be employed directly in the manufacture of belts according to the present invention or may be wound on reels and stored. On the other hand, it may be subjected, if so desired, to the following additional steps:

The cable is first passed through a bath 28 comprising a solution of rubber composition and a suitable solvent held in vessel 29 and thereafter through a drying compartment 30 wherein the solvent is evaporated and the rubber composition coated on the surface of the cable. The cable leaving the drying compartment or oven 30 is denominated 26' and comprises a rubber coated cable consisting of a plurality of plastic covered strands of wire formed into a cable 26 and baked to form an integral element.

The nature of the plastic material in the baths 14 and 24 will vary depending on the nature of the metal which is being treated and the nature of the rubber composition in baths 17 and 29. A plastic material known by the trade name "Butacite" and believed to be a polyvinyl butyral resin has been found well adapted for the purpose in mind. The resin is obtainable in flake form or in ready-mixed adhesive compositions. It is applied in the form of a solution or liquid and the solvent therein evaporated as hereinbefore noted.

Another material suitable for the purpose is called "Petrex" resin and this product is understood to be an unmodified alkyd resin made with polybasic terpene acids. When this resin has been partially converted to an infusible insoluble condition by baking at a temperature of from 150 to 350° C., it forms a firm bond with the metal and it is likewise highly adherent to rubber compositions.

A third material usable for the purpose is called "Tempotite No. 6." The chemical composition or identity of this material is unknown, but the product is generally known in the trade and is manufactured by Tempotite Plastics Company.

Those skilled in the art will understand that other plastic compositions exhibiting the characteristics of firm adhesion to metal and to rubber may be used in place of those above mentioned, but that no plastic composition should be used which contains any component which would exert a deleterious action on either the metal or the rubber.

As will be understood from the foregoing description of this invention, it is not strictly necessary to make use of a plastic coating in order to insure proper bond between the metal wire and the rubber composition of which the belts are made in view of the fact that the acid treatment of the wire (with or without electrolysis) is intended properly to condition the surface in a mechanical sense to receive and firmly hold onto rubber compositions of the general type utilized in the manufacture of rubber belts such as V-belts. The use of the plastic coating, however, materially aids in bringing about the adhesion and at the same time prevents any deleterious action by components of the rubber composition on the metal of which the wire is made. For example, sulfur or sulfur compounds generally present in rubber compositions will deleteriously affect copper wire, and applying a coating of plastic composition on the wire before coating it with rubber composition will serve to prevent this deleterious effect. This observation is made primarily by way of explanation and because copper wires or copper plated steel wires are frequently used in the manufacture of belts; however, the present invention is primarily concerned with the treatment of fine steel wires.

The purpose of the drying compartments or ovens 13 and 23 in the drawing is to remove moisture from the wire, and any suitable temperature may be employed therein. A temperature of from 100 to 150° C., for example, will prove advantageous.

The purpose of the compartments or ovens 16 and 27 in the drawing is to "set" the plastic composition and cause it firmly to adhere to the metal. The temperature employed will depend on the nature of the plastic composition coated on the wire, but temperatures of from 150 to 300° C. are generally found satisfactory.

The purpose of the compartments or driers 19 and 30 in the drawing is to evaporate volatile matter from the rubber solution in the vessels 18 and 29 in the drawing. This volatile matter will generally consist of solvent such as hydrocarbon solvents from petroleum or coal tar distillation, and since relatively low temperatures suffice to evaporate them and "set" the rubber coating, the temperatures required in the compartments or driers 19 and 30 in the drawing are relatively low and need seldom exceed 100° C. Warm air proves adequate and the air exhausted from the driers 19 and 30 may be advantageously conducted to a suitable solvent recovery system (not shown) for the extraction from the air for re-use of the solvents evaporated in the setting of the rubber composition as the wire or the cable passes through the drier 19 or the drier 30, respectively. Likewise, where solvents are used in the plastic compositions 14 and 24, the drying or baking compartments 16 and 27 may be connected to such a solvent recovery system for a like purpose.

It will be understood that while there have been described herein and illustrated in the annexed drawing certain embodiments of the method of the present invention, it is not intended thereby that this invention be limited to or circumscribed by the particular details of construction, arrangement of parts, materials, or procedures described herein or illustrated in the annexed drawing in view of the fact that this invention is susceptible to modifications depending on individual preference, circumstances and conditions without departing from the spirit of this disclosure and the scope of the appended claims.

We claim:

1. The method of making a coated steel wire cable adapted to form a firm bond with rubber composition which comprises passing a plurality of wires through an acid surface roughening bath, drying the wires, passing the dried wires through a solution of synthetic resin adapted to adhere to rubber, cabling the wires, and evaporating the solvent from the coated cabled wires, whereby there is produced a unitary article comprising a plurality of wires formed into a cable and adhesively held to each other by the resin coating thereon.

2. The method of making a coated steel wire cable adapted to form a firm bond with rubber composition which comprises passing a plurality of wires through an acid surface roughening bath, drying the wires, passing the dried wire through a solution of synthetic resin adapted to adhere to rubber, cabling the wires, evaporating the solvent from the coated cabled wires whereby to produce a unitary article comprising a plurality of wires formed into a cable and adhesively held to each other by the resin coating thereon, and thereafter covering said cable with rubber composition.

3. The method of making a coated steel wire cable adapted to form a firm bond with rubber composition which comprises subjecting a plurality of wires to an acid surface roughening wash comprising a solution of an acid selected from the group consisting of hydrochloric acid and phosphoric acid, drying the wires, applying a coating of synthetic resin adherent to rubber on the dried wires, cabling the wires, and baking the cabled resin coated wires whereby to produce a unitary article comprising a plurality of wires formed into a cable and adhesively held to each other by the resin coating thereon.

4. The method of making a coated steel wire cable adapted to form a firm bond with rubber composition which comprises subjecting a plurality of wires to an acid surface roughening wash comprising a solution of an acid selected from the group consisting of hydrochloric acid and phosphoric acid, drying the wires, applying a coating of synthetic resin adherent to rubber on the dried wires, cabling the wires, baking the resin coated wires whereby to produce a unitary article comprising a plurality of wires formed into a cable and adhesively held to each other by the resin coating thereon, and thereafter applying on said cable a coating of rubber composition.

5. The method of making a coated steel wire cable which comprises passing a plurality of wires through an acid surface roughening solution, drying the wires, cabling the dried wires, and applying a coating of rubber composition on the cabled wires.

E. L. LUÁCES.
MELVIN A. CROSBY.